(12) United States Patent
Talmage, Jr.

(10) Patent No.: US 7,234,667 B1
(45) Date of Patent: Jun. 26, 2007

(54) MODULAR AEROSPACE PLANE

(76) Inventor: Robert N. Talmage, Jr., 6555 Mill Creek Rd., Acworth, GA (US) 30102

( * ) Notice: Subject to any disclaimer, the term of this patent is extended or adjusted under 35 U.S.C. 154(b) by 0 days.

(21) Appl. No.: 11/007,855

(22) Filed: Dec. 9, 2004

Related U.S. Application Data

(60) Provisional application No. 60/528,307, filed on Dec. 11, 2003.

(51) Int. Cl.
*B64C 1/00* (2006.01)
(52) U.S. Cl. ..................................................... 244/120
(58) Field of Classification Search ................ 244/120, 244/2, 118.2, 119, 125, 136–137.4, 131, 138 R, 244/139, 140, 144, 25, 159.4, 159.5, 159.6, 244/134, 58
See application file for complete search history.

(56) References Cited

U.S. PATENT DOCUMENTS

| | | | | |
|---|---|---|---|---|
| 1,749,769 A * | 3/1930 | Johnson | ....................... | 244/49 |
| 2,115,932 A * | 5/1938 | Poindexter et al. | ......... | 244/140 |
| 2,352,721 A * | 7/1944 | Krahel | ....................... | 244/147 |
| 2,388,380 A * | 11/1945 | Bathurst | .................. | 244/118.2 |
| 2,418,301 A * | 4/1947 | Heal | ........................... | 244/91 |
| 2,462,462 A * | 2/1949 | Boggs et al. | ................... | 244/2 |
| 2,532,159 A * | 11/1950 | Fulton, Jr. | ..................... | 244/2 |
| 2,562,491 A * | 7/1951 | Hall | .............................. | 244/2 |
| 2,650,049 A * | 8/1953 | Fowler | .................... | 244/118.1 |
| 2,941,764 A * | 6/1960 | Lee, Jr. et al. | ............... | 244/140 |
| 2,981,499 A * | 4/1961 | Janney, II | ..................... | 244/2 |
| 2,992,794 A * | 7/1961 | Boyd | ........................ | 244/3.15 |
| 3,017,137 A * | 1/1962 | Helmke et al. | ................ | 244/2 |
| 3,069,112 A * | 12/1962 | Patterson | .................... | 244/3.19 |
| 3,162,398 A * | 12/1964 | Meyer et al. | ................ | 244/3.1 |
| 3,227,399 A * | 1/1966 | Dastoli et al. | ................. | 244/2 |
| 3,289,974 A * | 12/1966 | Cohen et al. | ............. | 244/159.3 |
| 3,315,920 A * | 4/1967 | Caughron | .................... | 244/139 |
| 3,360,220 A * | 12/1967 | Meyer | ......................... | 244/205 |
| 3,377,037 A * | 4/1968 | Stewart | .................... | 244/17.15 |
| 3,392,941 A * | 7/1968 | Cason, III | .................. | 244/3.21 |
| 3,409,254 A * | 11/1968 | Nastase | .................. | 244/138 R |
| 3,508,727 A * | 4/1970 | Willems | ..................... | 244/140 |
| 3,589,300 A * | 6/1971 | Wipf | ........................... | 104/281 |
| 3,640,491 A * | 2/1972 | Harrison | ................. | 244/117 R |
| 3,662,554 A * | 5/1972 | De Broqueville | ............ | 60/202 |

(Continued)

OTHER PUBLICATIONS

"Superconductivity." Wikipedia, The Free Encyclopedia. Jul. 22, 2006, 02:37 UTC. Wikimedia Foundation, Inc. Jul. 24, 2006 <http://en.wikipedia.org/w/index.php?title=Superconductivity&oldid=65142811>.*
"Superconducting magnetic energy storage." Wikipedia, The Free Encyclopedia. Jul. 19, 2006, 14:28 UTC. Wikimedia Foundation, Inc. Jul. 24, 2006 <http://en.wikipedia.org/w/index.php?title=Superconducting_magnetic_energy_storage&oldid=64667396>.*
"Aileron." Wikipedia, The Free Encyclopedia. Dec. 26, 2006, 21:06 UTC. Wikimedia Foundation, Inc. Jan. 3, 2007 <http://en.wikipedia.org/w/index.php?title=Aileron&oldid=96606981>.*

*Primary Examiner*—Teri Pham Luu
*Assistant Examiner*—Stephen A Holzen
(74) *Attorney, Agent, or Firm*—Rodgers & Rodgers

(57) ABSTRACT

This invention relates to the design of a Modular Aerospace Plane (MAP) comprising a forward fuselage section, a main wing section, a tail section and wing attachments. Various sections can be integrated to offer a variety of aircraft characteristics, performance and missions. This modular design offers a new method of aircraft fabrication, maintenance, repair and ground handling to reduce costs for the manufacturers, owners and operators. The forward fuselage and tail sections may utilize a parachute device whereby these sections can separate in an emergency and safely lower the occupants to the ground.

14 Claims, 6 Drawing Sheets

U.S. PATENT DOCUMENTS

| | | | | |
|---|---|---|---|---|
| 3,703,265 | A * | 11/1972 | Troitino | 244/13 |
| 3,833,192 | A * | 9/1974 | Vitack et al. | 244/139 |
| 3,881,671 | A * | 5/1975 | Bouchnik | 244/140 |
| 3,935,664 | A * | 2/1976 | Neuhierl | 446/34 |
| 3,999,728 | A * | 12/1976 | Zimmer | 244/140 |
| 4,108,402 | A * | 8/1978 | Bowen | 244/139 |
| 4,143,841 | A * | 3/1979 | Roeder | 244/140 |
| 4,306,693 | A * | 12/1981 | Cooper | 244/135 R |
| 4,379,533 | A * | 4/1983 | Caldwell et al. | 244/118.1 |
| 4,417,708 | A * | 11/1983 | Negri | 244/45 R |
| 4,447,025 | A * | 5/1984 | Bock et al. | 244/118.2 |
| 4,494,940 | A * | 1/1985 | Gretz | 446/61 |
| 4,537,373 | A * | 8/1985 | Butts | 244/22 |
| 4,580,746 | A * | 4/1986 | Peck | 244/140 |
| 4,591,114 | A * | 5/1986 | Block | 244/120 |
| 4,642,062 | A * | 2/1987 | Dorffler | 446/68 |
| 4,699,336 | A * | 10/1987 | Diamond | 244/140 |
| 4,736,910 | A * | 4/1988 | O'Quinn et al. | 244/120 |
| 4,746,081 | A * | 5/1988 | Mazzoni | 244/89 |
| 4,791,850 | A * | 12/1988 | Minovitch | 89/8 |
| 4,940,195 | A * | 7/1990 | Jackson | 244/1 R |
| 5,009,374 | A * | 4/1991 | Manfredi et al. | 244/1 R |
| 5,017,549 | A * | 5/1991 | Robertson | 505/164 |
| 5,088,661 | A * | 2/1992 | Whitener | 244/76 R |
| 5,356,094 | A * | 10/1994 | Sylvain | 244/49 |
| 5,356,097 | A * | 10/1994 | Chalupa | 244/139 |
| 5,379,969 | A * | 1/1995 | Marx et al. | 244/49 |
| 5,507,451 | A * | 4/1996 | Karnish | 244/2 |
| 5,525,087 | A * | 6/1996 | Chin-Lin | 446/59 |
| 5,568,903 | A * | 10/1996 | Pena et al. | 244/140 |
| 5,592,413 | A * | 1/1997 | Spitzer | 365/151 |
| 5,673,873 | A * | 10/1997 | Stemme | 244/99.12 |
| 5,826,827 | A * | 10/1998 | Coyaso et al. | 244/139 |
| 5,899,414 | A * | 5/1999 | Duffoo | 244/139 |
| 5,909,858 | A * | 6/1999 | Hawley | 244/36 |
| 5,921,504 | A * | 7/1999 | Elizondo | 244/140 |
| 5,975,464 | A * | 11/1999 | Rutan | 244/120 |
| 6,065,720 | A * | 5/2000 | Ash et al. | 244/120 |
| 6,070,831 | A * | 6/2000 | Vassiliev et al. | 244/120 |
| 6,086,014 | A * | 7/2000 | Bragg, Jr. | 244/2 |
| 6,114,050 | A * | 9/2000 | Westre et al. | 428/608 |
| 6,129,306 | A * | 10/2000 | Pham | 244/2 |
| 6,144,899 | A * | 11/2000 | Babb et al. | 701/3 |
| 6,158,693 | A * | 12/2000 | Mueller et al. | 244/158.9 |
| 6,213,427 | B1 * | 4/2001 | Mareska | 244/118.5 |
| 6,247,668 | B1 * | 6/2001 | Reysa et al. | 244/58 |
| 6,247,671 | B1 * | 6/2001 | Saeks et al. | 244/205 |
| 6,260,798 | B1 * | 7/2001 | Casiez et al. | 244/49 |
| 6,382,563 | B1 * | 5/2002 | Chiu | 244/120 |
| 6,425,794 | B1 * | 7/2002 | Levy et al. | 446/34 |
| 6,494,404 | B1 * | 12/2002 | Meyer | 244/118.2 |
| 6,554,227 | B2 * | 4/2003 | Wolter | 244/140 |
| 6,568,632 | B2 * | 5/2003 | Page et al. | 244/36 |
| 6,675,408 | B1 * | 1/2004 | Mason | 5/2.1 |
| 6,708,924 | B2 * | 3/2004 | Page et al. | 244/36 |
| 6,761,334 | B1 * | 7/2004 | Nutu et al. | 244/140 |
| 6,776,373 | B1 * | 8/2004 | Talmage, Jr. | 244/140 |
| 6,926,235 | B2 * | 8/2005 | Ouellette et al. | 244/120 |
| 2002/0056788 | A1 * | 5/2002 | Anderson et al. | 244/119 |
| 2002/0197929 | A1 * | 12/2002 | Chen | 446/61 |
| 2003/0057325 | A1 * | 3/2003 | Carroll | 244/120 |
| 2003/0127565 | A1 * | 7/2003 | Haffen et al. | 244/139 |
| 2004/0169110 | A1 * | 9/2004 | Wyrembek et al. | 244/113 |
| 2004/0195454 | A1 * | 10/2004 | Page et al. | 244/120 |
| 2005/0029400 | A1 * | 2/2005 | Ouellette et al. | 244/120 |
| 2005/0215168 | A1 * | 9/2005 | Kimura | 446/34 |
| 2005/0224642 | A1 * | 10/2005 | Sullivan | 244/111 |
| 2005/0242240 | A1 * | 11/2005 | Giannakopoulos | 244/140 |
| 2005/0250407 | A1 * | 11/2005 | Frontera Castaner | 446/36 |

* cited by examiner

MODULAR AEROSPACE PLANE

The benefits under 35 U.S.C. 119 are claimed of provisional patent application 60/528,307 filed Dec. 11, 2003.

FIELD OF THE INVENTION

The present invention, generally, relates to a new and improved system involving a method and an apparatus, by which a Modular Aerospace Plane (MAP), comprising modular components, a forward fuselage section, a main wing section, wing attachments, and a tail section can operate as an aerospace vehicle with improved levels of performance in speed, altitude, range, aerodynamic balance, STOL, versatility, economics and whereby occupants can survive any in-flight emergency over land or water in an escape module. When equipped with rocket propulsion, the MAP can fly into space and re-enter the atmosphere for a conventional landing.

BACKGROUND OF THE INVENTION

It has been a long felt need to design an aircraft with the ability to fly various missions, whereby, the plane can quickly change between a Short Take Off and Landing (STOL) aircraft, a surveillance or weapons platform, a commercial transport, a supersonic aerospace vehicle or a plane to loiter at high altitudes. Previous work on variable sweep wings aircraft such as the F-14 Tomcat, The F-111 Aardvaark, and the B-1B Bomber have been able to improve take off and landing performance over other supersonic vehicles yet they suffer major shifts in aerodynamic balance and reduced supersonic performance with the additional weight and complexity of the variable sweep wings. Previous work on the oblique wing has not produced a production aircraft and furthermore, still faces safety and technological challenges. Neither the variable sweep wing nor the oblique wing concepts have produced a commercial vehicle.

A further long-term desire has been for an aircraft to safely fly supersonic over long distances with good take off and landing characteristics. Although attempts have been made for the before mentioned goals, the Concorde has been the only commercial vehicle produced. However, the Concorde has recently been abandoned. All of these concepts have used a delta or highly swept wing design, which attributes to many of the problems associated with these supersonic planes. In general, the low lift to drag characteristics of these planes creates problems such as increased fuel consumption, smaller payloads, high heat loads and poor take off and landing characteristics. At transonic speeds, the delta wing design also experiences major shifts in aerodynamic balance and subsequently, the Concorde must utilize an intricate system to move fuel around to help control its weight and balance.

Safe air transportation has always been a primary concern. Current safety methods rely on the aircraft to survive a vehicle malfunction or failure. Small military aircraft use ejection seats or individual parachutes. No current system is operating in which one or more of the modules or sections of an aircraft is designed to separate from the stricken parent vehicle in an emergency and safely carry the crew and passengers to earth.

The high cost and economics of current aircraft manufacturing, maintenance, training and flight-testing contributes to much of the expense of aircraft ownership and operations. An economical vehicle could be easily constructed of modular sections to provide a variety of aircraft platforms, which would utilize common cockpits, aircraft systems and structures. Such an aircraft would dramatically reduce the cost of training, manufacturing and maintenance. The modular method of construction enables the basic MAP to be quickly configured with specialized or replacement modules and avoid long periods of aircraft downtime.

The present invention helps to solve some of the major problems associated with the prior art by using Stable Center of Lift (SCL) wings, whereby improving lift to drag, aerodynamic control, balance and permits the utilization of wing attachments. The various wing attachments offer the optimum wingspan, size and configuration for different speed envelopes. Designing the main wing as a module which accommodates wing attachments makes it possible to replace wing attachments with little down time, reduce the wingspan for better ground handling and simplify transportation by shipping the main wing module and wing attachments separately.

These objects, together with other objects and methods, which will be subsequently apparent, reside in the details of construction and operation as more fully hereinafter described and claimed.

SUMMARY OF THE INVENTION

It is an object of the present invention to provide a new aerospace vehicle with improved safety, performance, and versatility over existing vehicles, with the ability to change wings, select different aircraft modules which integrate into the aircraft platform to support various missions and reduce the cost of manufacturing, maintenance, upgrades and flight testing. Furthermore, it is an object of this invention to provide a vehicle capable of supersonic speeds over long range with minimal sonic boom disturbance and/or to rise above into space and return.

This invention embodies an aircraft comprised of three main sections or modules and wing attachments. All three aircraft sections can be configured for a variety of passenger, payload, fuel or aircraft systems. The forward fuselage section encompasses the nose wheel, the canard, the cockpit, the avionics, the passenger cabin, a payload area and aircraft systems. Various foreword fuselage sections can utilize an escape cabin and/or any combinations of passenger, payload and aircraft systems to satisfy mission requirements. The entire forward section can be separated from the vehicle with explosive bolts or other methods of separation known to those skilled in the art. This design feature separates the weight and dangerous flammable fuel of the parent vehicle from the forward section in order to safely lower the forward section with passengers to the ground using parachutes and deceleration devices. The middle or main wing section encompasses the SCL wing or main aerodynamic wing, receptacles for the wing attachments, engines mounted on the main wings, main landing gear, fuel, aircraft systems and passenger or payload space. The tail section encompasses the rudder, elevators, optional third engine, fuel, aircraft systems and passenger or payload space.

When assembled, these three aircraft sections or modules provide the basic aircraft platform tailored to a specific role. Wing attachments of various lengths and configurations attach to the end of the main wings for the required lift and roll control. The selection of various wing attachments allows the MAP to quickly change flight characteristics to perform a specific mission. The base line vehicle, which is designed to operate at the fastest speeds and highest aerodynamic pressures, incorporates the smallest wing attachment designed primarily as an aileron for roll control. Wing attachments may also incorporate conventional flaps. A hinged wing attachment can be used for aircraft carrier operations. All wing attachments can be removed for improved ground handling or replacement and repairs. The ability to quickly change the flight characteristics of an aircraft for a specific mission or replace damaged components is of particular interest to the military. The main wing section can also use a standard fixed wing typical on existing aircraft if variable aircraft performance is not of design interest.

The forward section is designed to carry the crew and/or passengers with a new level of safety in air transportation. This section can incorporate an Aircraft Escape Cabin (AEC) as described in U.S. Pat. No. 6,776,373 to Robert N. Talmage, Jr. dated Aug. 17, 2004 which can accommodate a small crew, separate from the parent aircraft, glide and/or parachute to a landing, and withstand the high heating and aerodynamic loads of a hypersonic escape. The entire forward section can also be designed with a duel role as escape module which can separate in an emergency and safely lower all passengers by parachute without the dangers of flammable fuels. This safety feature adds minimum cost, complexity or weight to the MAP. Military crews flying the MAP in hostile environments will be able to survive most attacks and parachute to the ground with classified information and equipment. Various forward sections can be tailored for specific size crews and weapons systems, all of which attach to the same basic aircraft platform.

All tail sections will support the rudder and elevators for aircraft yaw and pitch control. These controls will be designed to provide effective control in both subsonic and supersonic speeds. MAPs configured primarily for passengers may utilize a tail section with seating. This tail section can be designed to separate like the forward section in an emergency to safely parachute the occupants to earth or the tail section can be designed primarily for baggage. Various tail sections can be configured to accommodate the aircraft main engines, fuel, aircraft systems, auxiliary power unit, rocket engine and payload. The tail section can also be permanently attached to the main wing section.

The dynamic balance of an aircraft's weight, thrust and aerodynamic forces is critical for a high performance and safe vehicle. Supersonic vehicles experience additional problems as the center of lift changes from subsonic to supersonic speeds. For this reason, the invention embodies a SCL wing, perpendicular to the fuselage to minimize movement of the center of lift. To define and quantiate this concept, the Aerodynamic Balance Ratio (ABR) was developed as an indicator of how well an aircraft is balanced for supersonic speeds. The (ABR) is the maximum longitudinal displacement or movement of a plane's aerodynamic center of lift throughout the vehicle's speed range, divided by the fuselage length, and multiplied by ten. Current supersonic vehicles have a ABR>1 and are unable to benefit from a favorable aerodynamic balance. High performance aerospace vehicles will have a ABR<1 and be able to meet the stringent weight and balance requirements of a practical supersonic vehicle. The MAP is embodied to have an ABR<1 and offer new levels of service in the safety, cost and performance of a supersonic aerospace plane.

Additionally, this invention embodies a vehicle configured to maximize the pitch control forces of the canard and elevator to provide efficient control of the MAP's weight and balance. To quantitate and define this concept, the Elevator Moment Ratio (EMR) was developed. The EMR is the ratio of the longitudinal distance from the planes' aerodynamic center of lift to the elevator's center of lift, divided by the fuselage length. An EMR>0.4 is standard for conventional subsonic aircraft. Current supersonic vehicles have an EMR<0.4. The MAP's EMR is embodied to be greater than 0.4 and the MAP can also utilize canards for additional pitch control and transonic stability.

The elevator and rudder will be positioned and designed to be effective at subsonic and supersonic speeds. By utilizing wings with the ABR<1, it will minimize movement of the center of lift. Designed with a EMR>4, the invention reduces the amount of pitch control forces necessary and enables the MAP to use smaller canards and elevators surfaces which helps to reduce drag.

This invention embodies fixed and magnetohydrodynamic devices to manipulate supersonic flow in order to reduce shock waves, aero thermodynamic heating, sonic boom and drag. The fixed devices include fairings, spikes, vortex generators, and trailing edge devices. The magnetohydrodynamic devices involve a electric power source to charge electrodes strategically placed on the MAP in order to develop electric fields and manipulate the supersonic flow of air around the vehicle.

A further embodiment of this invention is the Superconducting Magnetic Energy Storage System (SMES) device. This device uses high temperature superconducting material to energize an electromagnetic power source. This device is surrounded by a liquid coolant and/or cool air stream to cool the SMES device. Prior to takeoff, the liquid coolant can be replaced and the SMES device charged by an auxiliary power source. Super cold air in the upper atmosphere can be combined with a refrigeration device to provide additional cooling in flight and the aircraft engines can recharge the SMES device. The SMES device is designed to provide a large burst of power to operate the electric propulsion, fire electronic weapons, and power the magnetohydrodynamic device.

Embodied in this invention is electric propulsion during take off. By charging the SMES device by an auxiliary power source or its own engines, the SMES device powers electric motors connected to the main landing wheels for electric propulsion. These motors can provide the MAP with additional take-off acceleration capability such that it could dramatically reduce runway requirements or even eliminate the need of mechanical assistance during take-off from an aircraft carrier. These same electric wheel motors also pre-spin the tires for touch down, serve as brakes and propel the MAP for ground maneuvering.

The MAP design also offers safe protection from a terrorist attack either from the ground or within the aircraft. In the event of a ground attack and the engines are destroyed, the MAP separates for a safe landing of passengers, equipment and flight data. If a bomb is contained in baggage which is located in either the middle or tail section and away from the passengers in the forward section, the MAP can survive the explosion and safely land with all passengers and survival equipment.

The failsafe and versatile aspects of the MAP also make it the ideal test plane. Different tail sections can test various engines and configurations using the same forward and middle section. The ability to change wing attachments and vary aircraft performance provides the engine tests to be conducted within their designed operations speeds, altitudes and actual flight conditions. In addition, an engine malfunction or explosion does not result in a loss of crew or flight data.

The advantageous features and performance of the MAP also apply to an Unmanned Aerial Vehicle (UAV). The safe return of UAV equipment and data is often a high priority.

The modular UAV offers the desired ground handling, storage and transportation characteristics to improve operations. Replacement modules also reduce downtime and costs.

Further areas of applicability and methods of the present invention will become apparent from the detailed description provided hereinafter. It should be understood that the detailed description and specific examples, while indicating the preferred embodiments of the invention, are intended for purposes of illustration only and are not intended to limit the scope of the invention.

DETAILED DESCRIPTION OF THE INVENTION

Figure 1:
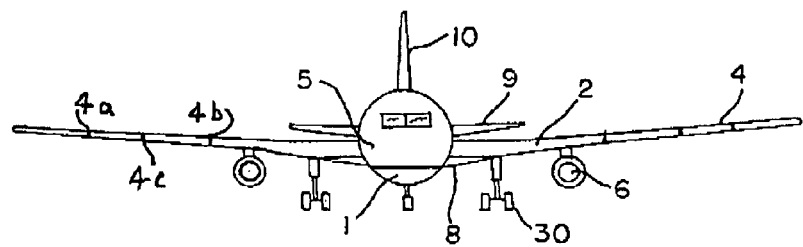
FIG. 1 is a front view of the MAP with a high lift wing attachment and escape cabin.

With reference to FIG. 1 of the drawings, the illustrated vehicle demonstrates the relative position of the four lifting surfaces, the canard 8, the main wing 2, the wing attachments 4 and the elevators 9. Numerals 4a, 4b and 4c in FIG. 1 designate the wing tips of wing attachment 4 which are of varying lengths. The location of these flight surfaces will have a beneficial effect on each other to improve lift, aerodynamic performance and balance. In level cruise attitude, the frontal cross section area of the canard and the elevator disappear into the main wing to minimize drag and sonic disturbance.

The configuration of the Stable Center of Lift (SCL) main wing design will restrict movement of the center of lift, permit the utilization of the wing attachments 4 and reduce cost. For purposes of flight control, ailerons 4a are mounted on wing attachments 4. In order to offer improved aerodynamic balance and efficient aerodynamic control, the main wing section 2 is also configured for optimum interaction with the canard 8 located on the forward fuselage section 1 and the elevators 9 located on the tail section 3. This unique characteristic of the aircraft platform enables the MAP to provide optimum control and balance through out the subsonic, transonic and supersonic range. This method and design of the aerodynamic flight surfaces and controls offers a favorable ABR. These embodied aircraft modular sections and wing attachments permit aircraft platform versatility, failsafe capability, improved ground handling, reduced manufacturing cost, lower maintenance cost and less down time. Furthermore, this modular method of fabrication simplifies the movement and transportation of the individual modules on the ground or for transportation by air.

Figure 2:
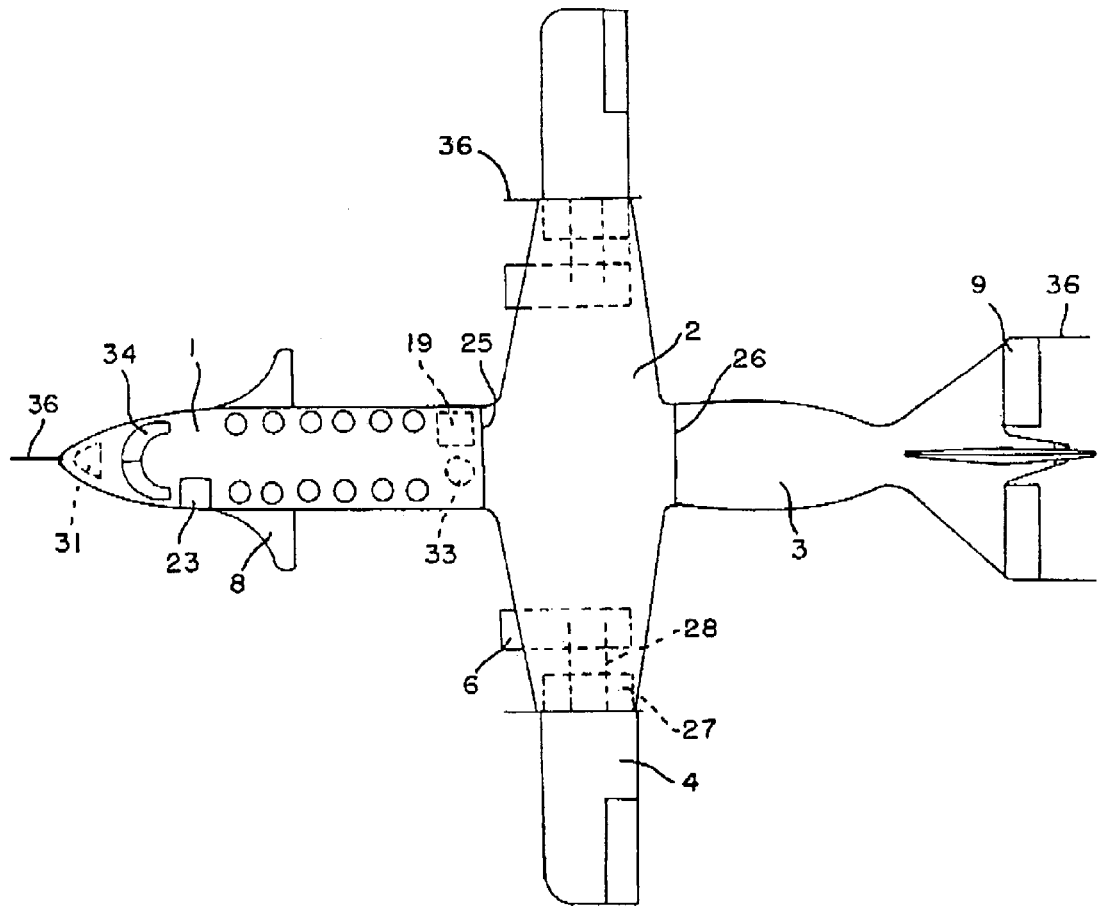
FIG. 2 is a top view of the MAP without the escape cabin and forward fuselage section designed for passage area and with wing attachments of shorter length than shown in FIG. 1.

FIG. 2 of the drawings clearly depicts the three main sections of the MAP. The forward fuselage section 1 is attached to the main wing section 2 and which is attached to the tail section 3 in a similar fashion by bolting corresponding flanges in each section. These connecting flanges 25, 26 are an integral part of the fuselage structure and when bolted together, carry the necessary structural loads. A gasket can be located between the two connecting flanges to seal each section and permit cabin pressurization. This method of connecting the modules isolates destructive vibrations, thermodynamic expansion and contraction, and is the quickest, safest and least expensive method of attachment. Explosive bolts are used on modules designed to separate in an emergency. Located in close proximity to the connecting flanges are connectors for the electrical systems, aircraft equipment, as well as the pneumatic and hydraulic controls.

Figure 4:
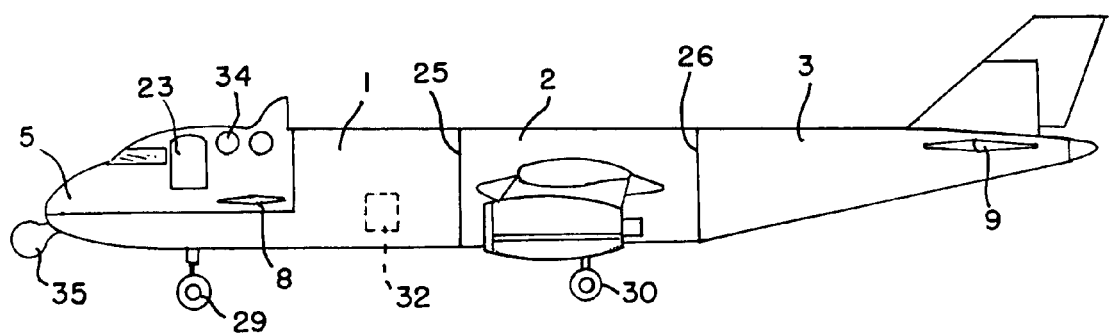
FIG. 4 is a side view of the MAP with escape cabin and forward section designed for electronic weapons.
Figure 6:
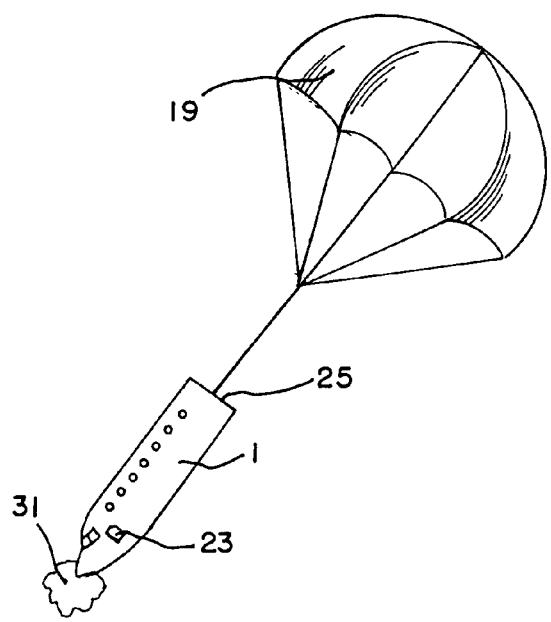
FIG. 6 is a side view of the forward fuselage section detached from the parent vehicle with the parachute and deceleration devices deployed.

The forward section 1 can be designed with an integral AEC 5, which separates from the forward section during an emergency. In FIG. 4, door 23 provides access to the AEC 5 and other sections or modules. The forward fuselage section 1 also supports and contains the nose wheel 29. To safely evacuate more passengers during an emergency, the entire forward section 1 can be designed to separate from the main wing section by utilizing explosive blots 14 in connecting flange 25. Incendiary devices 15 will sever all wiring and mechanical lines for aircraft systems. After separation the forward section will naturally fall and the main wing section and tail section will naturally pitch upward avoiding contact with each other. After separation a drogue-stabilizing parachute 33 can be deployed to assure proper orientation and speed of the forward fuselage section to safely deploy the main parachutes 19 as shown in FIG. 6. Deceleration devices 31 deploy to absorb the impact loads at touch down. Without the flammable fuel and weight of the main wing section and tail sections, the forward fuselage section can safely parachute passengers and crew to the ground or water landing. The sealed intact passenger module will float and protect occupants from hypothermia. The tail section can be utilized in a similar manner for passenger safety.

Figure 5:
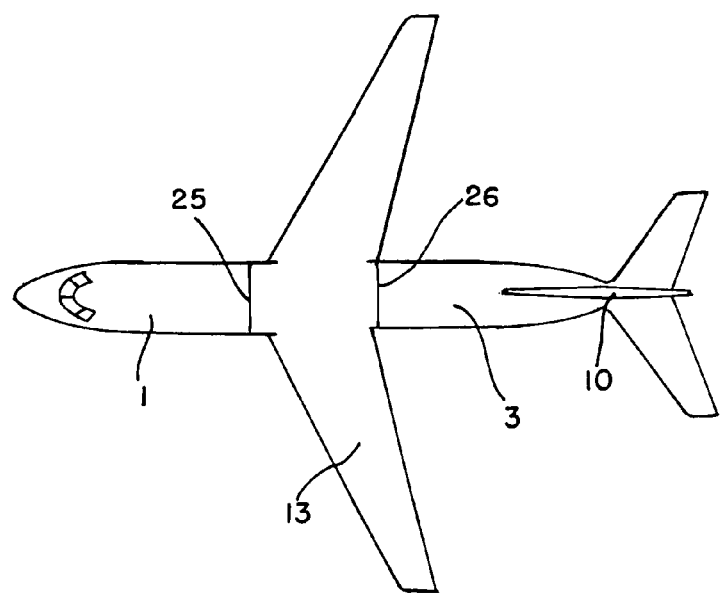
FIG. 5 is a top view of the MAP with the main wing section configured as a conventional fixed wing without wing attachments.

The main wing section 2 is located between the forward fuselage and tail sections. This main wing section supports and contains the main landing gear 30, carries fuel, supports the engines 6 mounted on the main wings and the receptacles 28 in which the wing attachments 4 plug into and attach. Access panel 27 permits access to connect the wing attachments, make necessary connections for the wiring and mechanical lines and perform inspections of the same. The main wing section can also be designed as a complete fixed wing 13 for a specific role as shown in FIG. 5 similar to wings on conventional aircraft. These conventional wings would not use wing attachments; however, the modular method and design would still enable the forward and tail sections to parachute safely to earth in an emergency and lower costs of fabrication and maintenance.

Figure 3:
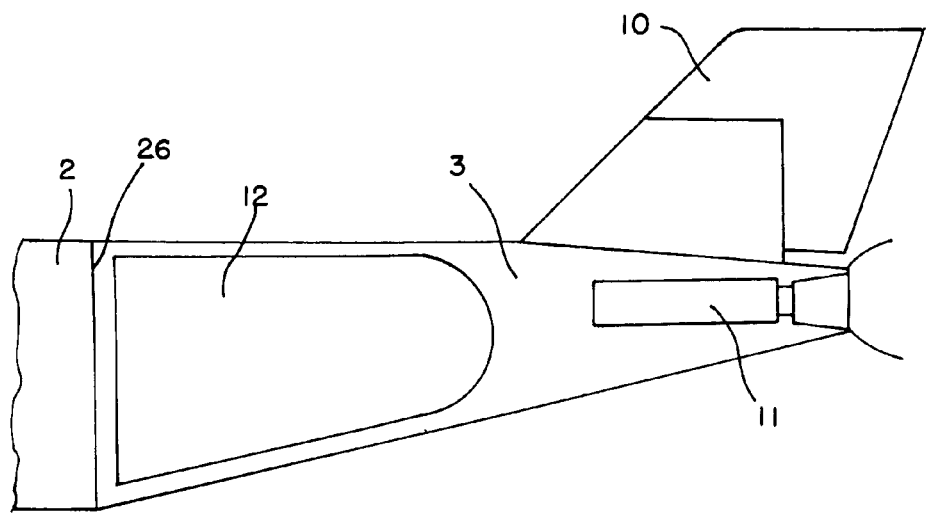
FIG. 3 is a cross-sectional side view taken generally along the centerline of the tail section designed for a rocket motor and fuel storage.
Figure 10:
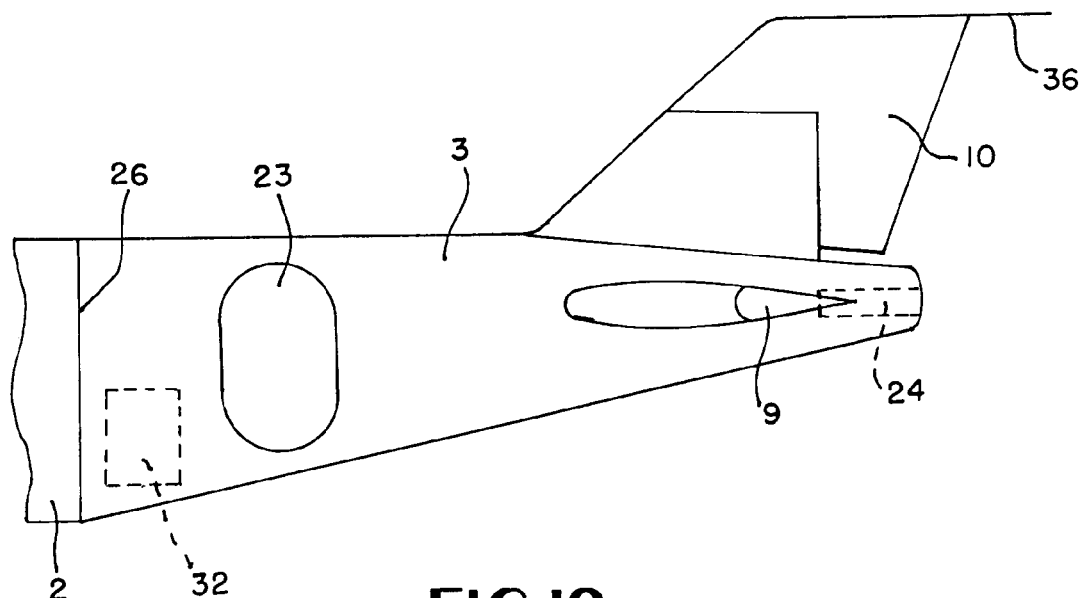
FIG. 10 is a side view of the tail section designed with an auxiliary engine.
Figure 11:
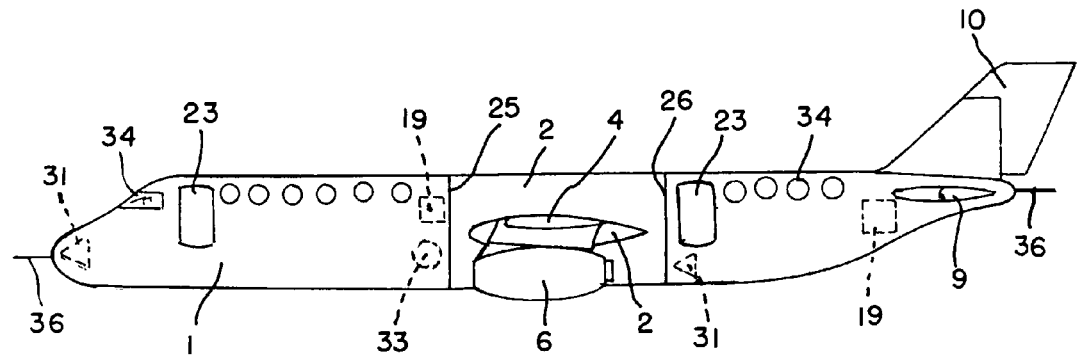
FIG. 11 is a side view of the MAP with the forward and tail section designed to carry passengers and parachute devices.

To provide yaw and pitch control, the tail sections 3 supports the elevator 9 and rudder 10. FIG. 11 illustrates a tail section designed for passengers with window aperture 34. To provide quick separation in an emergency, explosive bolts are utilized in connecting flange 26. Parachutes 19 located in the tail end will deploy out the rear. The tail deceleration devices 31 located on the interior bulkhead at connecting flange 26 deploy to absorb ground impact loads. The unique configuration of the MAP allows all four sections to be easily integrated into the appropriate aircraft platform for a specific mission. For instance, FIG. 3 depicts a tail section 3 with a rocket motor 11 and large fuel tank 12 for space propulsion. FIG. 10 illustrates a tail section with a auxiliary motor 24 which can supply electrical power for the aircraft and charge the SMES device 32.

Figure 9:
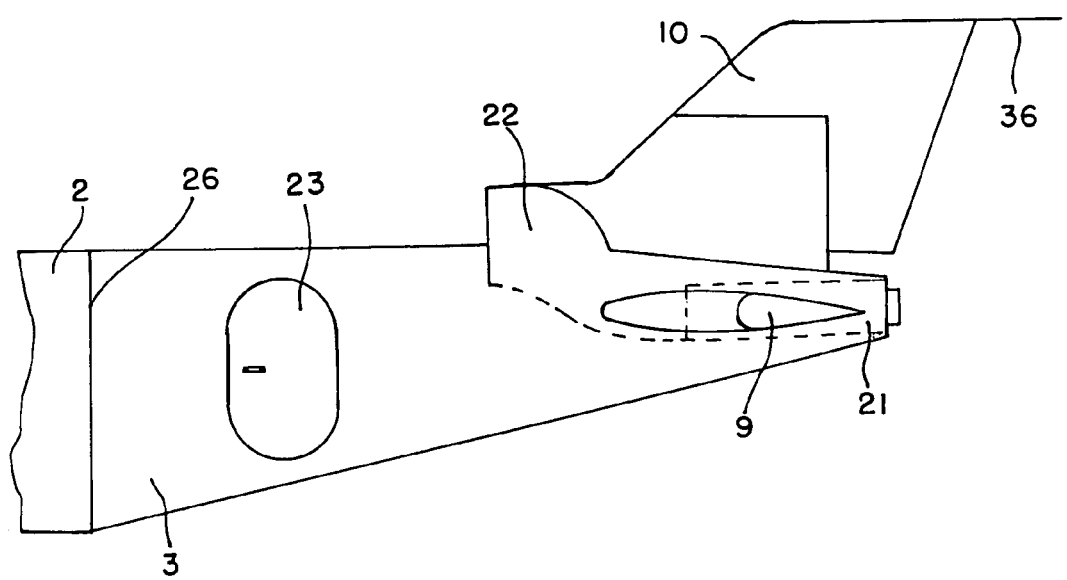
FIG. 9 is a side view of the tail section designed for a turbojet engine and air intake.

FIG. 9 illustrates a tail section designed to accommodate an aircraft engine 21 with air inlet 22. The tail can also be configured with the elevators above the rudder in a conventional T-tail design. This would permit location of the two main aircraft engines on the exterior of the tail section. The tail section can also be permanently attached to the main wing section.

Figure 7:
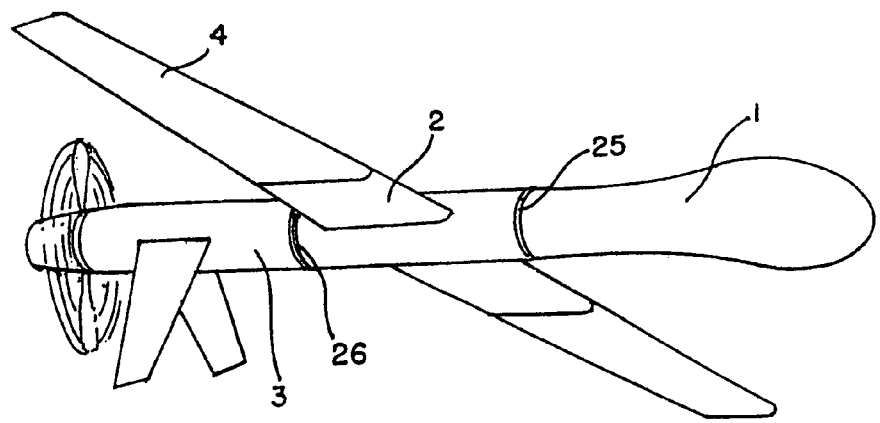
FIG. 7 is a perspective view of a UAV comprising the modular components.

The same advantages of the modular method and design in manufacturing, costs, maintenance and ground handling are desirable for Unmanned Aerial Vehicles (UAV) shown in FIG. 7. UAV operators may not have need to recover a specific module; however, the ability to separate modules for transportation or storage is a tremendous advantage in UAV operations.

Figure 8:
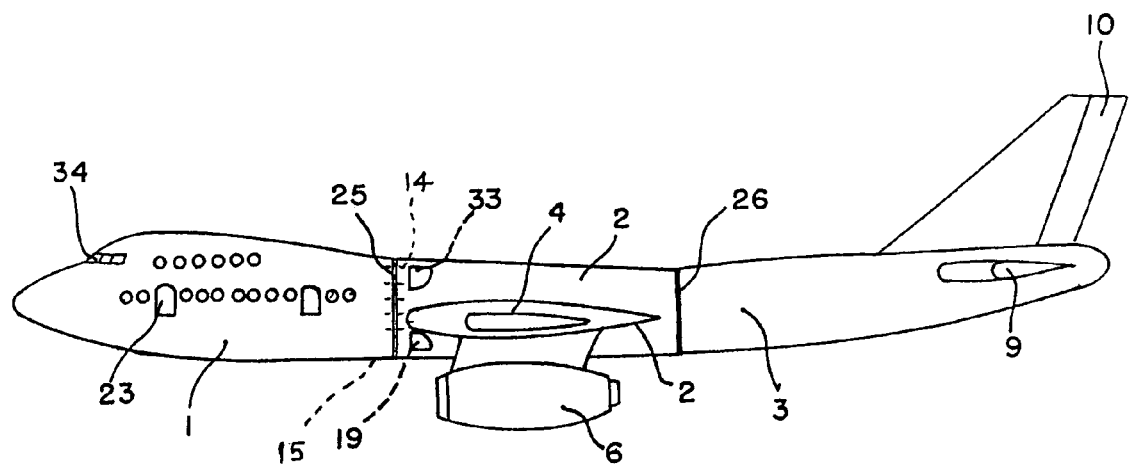
FIG. 8 is a side view of a large commercial airliner designed to accommodate passengers in the forward section and baggage in the tail section.

A high priority in commercial aviation is the failsafe feature of the MAP, which will safely recover the forward fuselage section or tail section in an emergency or terrorist attack. FIG. 8 represents a commercial MAP designed with passengers in the forward fuselage section and baggage in the tail section. This configuration will offer a terrorist-proof plane by separating the passenger area from the stored baggage area and permit the safe recovery of the forward section in the event of a bomb destroying the tail section or missile destroying the main wing section. Enlarging the forward section for the passengers can reduce drag and improve supersonic performance. Drogue stabilizing parachute 33 and main parachute device 19 are connected to the forward fuselage section and not attached to the main wing section. This illustration shows how the interior space of the main wing section can be used to accommodate the space requirements of the parachutes to maximize passenger space in the forward fuselage section. An interior bulkhead at the rear of the forward fuselage section maintains cabin pressure and parachutes devices can be located on either side of this partition.

Figure 12:
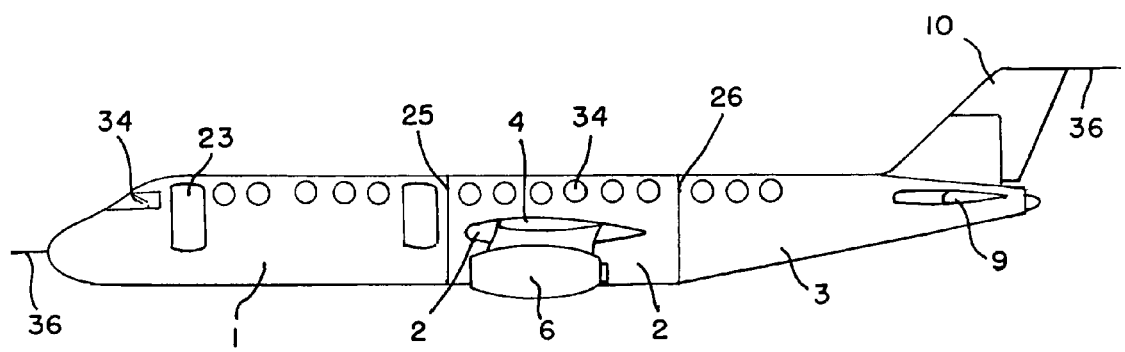
FIG. 12 is a side view of the MAP designed with the forward, main wing and tail sections all designed for passengers and no parachute devices.

FIG. 12 illustrates a MAP with the interior configured like a conventional passenger plane. There are no parachute devices or explosive bolts. The modular feature is utilized to reduce fabrication costs, offer a variety of aircraft performance and improve ground handling. This is just one of many different combinations of sections which aircraft owners may choose.

Supersonic shockwave manipulation embodied in this invention is achieved with fixed and magnetohydrodynamic devices 36 to reduce aerodynamic heating, drag and sonic disturbances. The fixed devices such as fairings, spikes, vortex generators and trailing edge devices are located on the vehicle to manipulate destructive shockwaves. Magnetohydrodynamic devices 36 are utilized to manipulate the supersonic flow in front of the vehicle and outside the effective range of the fixed devices. Magnetohydrodynamic devices charged by the electrical system are located on the fixed devices and the airframe to provide the most desirable effects.

To improve short take-off performance, this invention embodies a Superconducting Magnetic Energy Storage System (SMES) device 32 to power the electric wheels and provide additional take-off acceleration. The SMES device 32 is accessible from the ground to recharge the liquid coolant and energize the SMES device. Electric motors are connected to the main landing gear axles through gears to provide the necessary torque and speed.

On landing, the electric powered wheels can be spun prior to touch down and avoid the server loads associated with non-spinning wheels hitting the ground at a high speed under high impact loads. The electric motors will also serve as brakes during landings and the braking energy can be dumped into the SMES device. The electric powered wheels also provide forward, reverse and directional control, which eliminates the need for ground handling equipment.

In flight the SMES device 32 is charged by the aircraft engines and provides the large burst of power necessary to fire the electronic weapons 35. The SMES can also supplement the power necessary to operate the electronic shock wave manipulation devices.

Having briefly described and illustrated various components of the MAP it will be clear to those skilled in the art of various changes and components which may be substituted yet not depart from the scope of the invention. With this understood, I will briefly describe and outline the method embodied in this invention.

In it's simplest form, aircraft designers view the aircraft as a balancing act with the main wing as the center to lift the plane and with the forward fuselage section and tail section on either side of the main wing to balance it. Flight controls and various lifting surfaces located on either the forward fuselage section or the tail section can supplement the lift of the main wing and provide aerodynamic forces to balance the plane in flight. The size of the main wing determines how much it can lift and what minimum speed is required to fly.

This invention embodies a method, whereby, the wing surface area and configuration can be changed to obtain the desired flight characteristics. In addition, this invention embodies the ability to interchange various forward fuselage and tail sections to meet specific needs and desires of the operator. Furthermore, the method of attaching and detaching the various sections and wing attachments offers numerous advantages over conventional aircraft.

Initially, the aircraft must be designed whereby the desired sections can be connected and disconnected when desired. Corresponding flanges on each section and/or plug-in type connectors can be designed by those skilled in the art. Connections for the electrical wiring and mechanical lines that run between the sections will be located in close proximity to the connecting flanges. The sections, which are designed to quickly separate in an emergency, must be designed with explosive bolts to release the structural connections. Incendiary devices can be designed to serve the wiring and mechanical lines.

The next step is to fabricate the sections independently of each other. This enables sections to be fabricated in smaller facilities and/or off site. This method also facilitates easier handling and transportation of the various sections.

Once the individual sections are completed, they are brought together for the final assembly. This involves mating the sections together and connecting all wiring and mechanical lines. Fairings can be applied to the exterior to smooth the airflow. Gaskets and interior trim can be applied to the inside where the sections are joined. Exterior painting can be applied prior to final assembly or after.

The attachment process is simply reversed to disconnect the sections. A means for supporting and handling the individual sections is incorporated into the design.

Furthermore, this invention embodies a new method for major repairs, maintenance and refurbishing. Replacement sections, which are complete, tested and ready for service, can be alternated for sections in need of repair. Aircraft down time is reduced to the time required to switch the sections. The section in need of repair can then be refurbished or repaired in a smaller facility with optimal production schedules to achieve the highest standards. Various sections can be outfitted with different equipment, systems and configuration to satisfy specific missions. All systems and components can be plugged into test equipment to assure proper operation prior to being placed into service.

Wing attachments can be handled in a similar fashion. Wing attachments of various sizes and configurations can be interchanged to provide different aircraft performance for specific missions. Wing attachments may be easily removed to reduce the wingspan and improve ground handling.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. An aircraft constructed of modular sections comprising a forward fuselage section, said aircraft having a central longitudinal axis, a tail section having an elevator, a main wing section disposed intermediate and detachable from said forward section and said tail section, said main wing section extending substantially perpendicular to said central longitudinal axis, said sections having corresponding adjacent connecting flanges, said adjacent connecting flanges being interconnected by means of operationally disconnectable fasteners, two same length wing attachments that can be removed and replaced by wing attachments of a different length extending outwardly from said wing section and detachable therefrom, receptacles formed on the outer ends of said main wing section, said wing attachments partially disposed respectively in said receptacles and disconnectable therefrom by means of operationally manipulated fasteners, an effective center of lift disposed along said central longitudinal axis, said wing attachments including respectively an aerodynamic lifting surfaces and an ailerons, said forward fuselage section and said tail section having at least one door to access the outside and at least one door to access said main wing section, and access panels allowing access to electrical and mechanical lines.

2. An aircraft according to claim 1 wherein connections for all wiring and mechanical lines are disposed in close proximity to connecting flanges between each of said sections and said wing attachments.

3. An aircraft according to claim 1 wherein explosive bolts are utilized in one of said connecting flanges to provide rapid separation of two of said sections during an in-flight emergency.

4. An aircraft according to claim 1 wherein incendiary devices are disposed in close proximity of said connecting flanges to burn through wiring and mechanical lines which run through said connecting flanges designed to separate during an in-flight emergency.

5. An aircraft according to claim 1 wherein said wing attachments are of various lengths and configurations and are interchangeable and utilized to change the flight characteristics of the aircraft.

6. An aircraft according to claim 1 wherein a parachute is located in both said forward fuselage and said tail sections, and said parachutes are utilized to safely lower said forward fuselage and said tail section safely to the ground.

7. An aircraft according to claim 1 wherein said tail section contains fuel and a rocket engine or main aircraft engines.

8. An aircraft according to claim 1 wherein said main wing section is a fixed wing.

9. An aircraft according to claim 1 wherein said aircraft is constructed of a plurality of different fuselage configurations and wherein the aircraft is remotely controlled and operated as an unmanned aerial vehicle by means of controls associated with said forward fuselage sections.

10. An aircraft according to claim 1 wherein said forward section contains all passengers and contains seats and a parachute and deceleration devices to survive an aircraft malfunction or attack and said tail section includes restraining devices for baggage.

11. An aircraft according to claim 1 wherein magnetohydrodynamic devices are located on said aircraft and reduce supersonic drag, aerodynamic heating and minimize sonic boom.

12. An aircraft according to claim 1 wherein a superconducting magnetic energy storage system stores electrical energy to power electrical systems, electric wheels and MHD devices.

13. A Modular Aerospace Plane comprising:
a forward fuselage section having the cockpit, aircraft systems, an avionics suite, nose landing gear, at least one exterior door and at least one exterior aperture;
a main wing section including the main landing gear, fuel, aircraft systems and aerodynamic wing blended into the center fuselage;
a tail section having the vertical stabilizer attached thereto, the horizontal stabilizer attached thereto, the rudder, the elevator, the rear fuselage section, aircraft systems, at least one exterior door and at least one exterior window aperture;
wing attachments respectively including an aerodynamic lifting surfaces and an ailerons;
said forward fuselage section mating with and attaching to the forward portion of said main wing section;
said tail section mating with and attaching to the rearward portion of said main wing section;
said wing attachments mating with and attaching to each end of said main wing section;
all wiring and mechanical lines for the aircraft systems passing between the various sections having connectors located adjacent to the union to facilitate attachment and detachment of each section;
said sections having corresponding adjacent connecting flanges, said adjacent connecting flanges being interconnected by means of operationally disconnectable fasteners;
receptacles formed on outer ends of said outer wing section, said wing attachments partially disposed respectively in said receptacles and disconnectable therefrom by means of operationally manipulated fasteners;
said forward fuselage section, said tail section and said wing attachments being detachable from said main wing section; and
an effective center of lift disposed along the longitudinal axis of said forward fuselage section.

14. An aircraft according to claim 1 wherein aileron flight controls are operatively mounted on said wing attachments.

* * * * *